July 28, 1970 W. S. FILLER ET AL 3,521,725
DIRECTIONAL EXPLOSIVE ECHO RANGING DEVICE
Filed May 18, 1962 2 Sheets-Sheet 1

INVENTORS.
WILLIAM S. FILLER
JOSEPH PETES
BY *D. E. Hodges*
*J. D. Miller* ATTYS.

United States Patent Office

3,521,725
Patented July 28, 1970

3,521,725
DIRECTIONAL EXPLOSIVE ECHO RANGING
DEVICE
William S. Filler, Rockville, and Joseph Petes, Silver
Spring, Md., assignors to the United States of America
as represented by the Secretary of the Navy
Continuation-in-part of application Ser. No. 78,794,
Dec. 27, 1960. This application May 18, 1962, Ser.
No. 197,171
Int. Cl. H04b 11/00
U.S. Cl. 181—.5                          5 Claims The invention described herein may be manufactured and used by or for the Government of the United States of America for governmental purposes without the payment of any royalties thereon or therefor.

This application is a continuation-in-part of application Ser. No. 78,794, filed Dec. 27, 1960, now U.S. Pat. No. 3,184,955, and titled "Explosive Driven Conical Shock Tube."

The above-referenced application discloses the operation of an explosive driven conical shock tube per se. The subject invention relates to a new and improved conical shock tube which is particularly designed for use as an underwater vibration source having obvious application to echo ranging and sonar systems.

In the underwater acoustical art, and particularly in the military sonar system art, it has been the general practice to employ piezoelectric transducers for providing an acoustical signal and, although the advantages of an explosive type sound source has long been appreciated, such explosive sources have not been adapted for general use for the following reasons. First, it has been heretofore impossible to achieve significant directional characteristics of an explosive type sound source since the shock wave produced thereby emanates in all directions. This is undesirable to sonar systems since it would be difficult to differentiate between signals reflected from two targets on opposite sides of and at equal distances from the source; however, a directional sound source would eliminate this problem. Furthermore, a spherical wave will be reflected from the bottom of the body of water in which the charge is detonated and another wave will also be reflected by the surface thereof. Such a multiplicity of spurious signals would be highly objectionable and would yield very little useable data. The use of various types of reflectors to achieve directional characteristics has not proven to be efficient, but has in fact, proved to be undesirable since the reflectors introduce secondary and cursory reflections of the sound wave which further confuse the desired echo signals. Other attempts to utilize underwater explosive as sound signal sources have heretofore been severely limited in regard to safety and special or chronologically controlled repetitive firing, both of which features are necessary to a military sonar system. For these reasons, piezoelectric crystals have been almost universally adopted as sonar sources, however, such devices have a very limited range. With the advent of underwater craft having weapons with extended range, it is now imperative that an extended range sonar system be developed for detecting the enemy underwater craft.

It is therefore an object of the present invention to provide an explosive underwater sound source which has a greatly increased range, with a high degree of directionality and which can be loaded and fired as needed.

It is another object of the present invention to provide an explosively driven conical shock tube which may be repetitively fired.

It is still another object of the present invention to provide a new use for explosively driven conical tubes.

A still further object of the present invention is to provide a new and improved method of echo ranging.

A still further object is to provide a new and improved sound source of general application for underwater use.

Other objects and advantages of the invention will hereinafter become more fully apparent from the following description taken with the attached drawings which illustrate several preferred embodiments of the invention and wherein.

Figure 1:
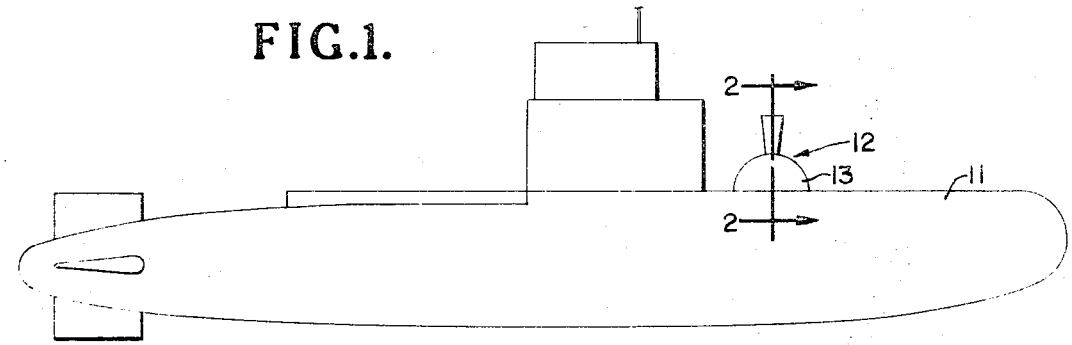
FIG. 1 is a simplified, schematic view of one form of the invention in combination with an underwater craft.

Referring now to the drawings wherein like reference numerals designate like parts throughout the several views there is shown in FIG. 1 a submarine 11 on which is mounted a sound tube assembly 12. The sound tube assembly 12 is shown in a vertical position, as viewed in the drawing, but is capable of being rotated to a horizontal position as will be more fully described hereinafter. A bubble or dome 13 provides protective covering for part of the sound tube assembly 12. It will be obvious that, whereas part of the tube assembly 12 is located inside of the dome 13 the entire tube assembly could be also located within the dome.

It will also be readily apparent that more than one sound tube assembly may be employed per underwater craft and that the location of the tube may also be varied from that shown by way of illustration in FIG. 1.

Figure 2:
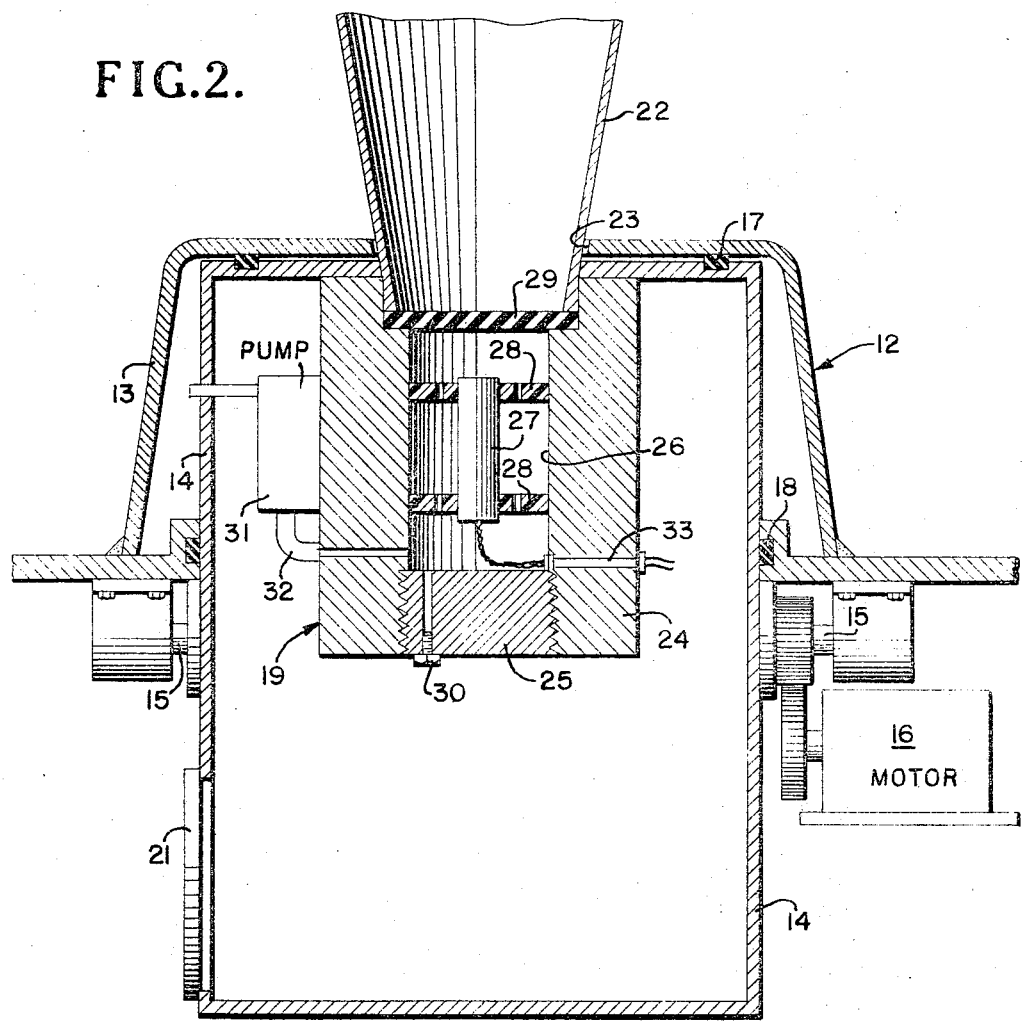
FIG. 2 is a diagrammatical view of the conical shock tube of FIG. 1 taken along line 2—2.

Refer to FIG. 2 which discloses a cylindrical housing 14 mounted within dome 13. A shaft 15 attached to either side of housing 14 allows the housing to rotate to the vertical and the horizontal planes as viewed in FIG. 1. A motor 16 is suitably geared to housing 14 and provides the power for rotation of housing 14. Seals 17 provide a continuous watertight seal between dome 13 and housing 14 and yet allow the housing 14 to rotate within dome 13. Seals 17 and 18 keep the sea water from entering the interior of the submarine. Access to the breach mechanism 19 is obtained by one or more suitable doors 21 in housing 14. The shock tube 22 is an integral part of housing 14 and rotates in slot 23 in the dome 13. The wall of shock tube 22 is of adequate thickness so that under the shock pressure load its deflection (elastic strain) is small and occurs slowly enough so that a rarefaction wave does not overtake and destroy the shock front. Within housing 14 and rigidly secured thereto is positioned the breech mechanism 19 which includes a casing portion 24 having a breech plug 25 removably secured to one end thereof. Casing portion 24 of the breech mechanism is provided with a central bore 26 wherein explosive charge 27 is held in spaced relationship to the wall thereof by means of annular spacing discs 28 which may be composed of a light weight material, such for example, as Styrofoam. In the form of the invention as shown in FIG. 2, explosive charge 27 is intended to be a high explosive such as TNT as opposed to a low intensity type of charge such as gun powder, the explosive characteristics of which vary considerably from that of a high explosive. For example, a high explosive is characterized by detonation pressures in the neighborhood of 4,000,000 p.s.i. and a resultant shock wave which has a supersonic velocity, whereas, a propellant type of charge such as gun powder will produce significant pressures only when suitably confined and even then they are of a relatively low magnitude. Thus, spacing rings 28 perform the necessary function of providing an intermediate space between charge 27 and the internal surface of bore 26 such that upon detonation the internal surface of bore 26 is not subjected to anywhere near the value of 4,000,000 p.s.i., but rather, will be subjected to pressures below the elastic limit of firing chamber material. For a more complete disclosure in regard to the characteristics of the shock wave produced by a high explosive, reference is made to copending application Ser. No. 78,794; however, it should be noted that the primary reason for employing a high explosive in the subject environment is that high explosives produce a shock wave wherein considerably greater amount of the total energy is in the low and middle frequency bands such as 1,000 to 5,000 cycles per second. Frequencies in this range are desirable since they are more easily propagated.

The maximum degree of directionality at great distances is obtained by correlating the three controlling parameters of the conical shock tube 22. These parameters are: (1) the firing weight of the high explosive; (2) the cone angle; and (3) the cone slant height. Varying these three parameters determines the exit magnitude of the shock wave and the distance the undiffracted shock wave will travel.

As the parameters of the conical tube are changed the phenomenon of diffraction and rarefaction is also changed to vary the distance the undiffracted shock wave will travel. For example, as a shock wave leaves the end of the cone it continues to expand both in the forward and lateral direction, as is well known in the art. However, the high pressure of the shock wave causes an additional lateral expansion into the adjacent undisturbed water at a rate greater than the normal lateral shock wave expansion. This is called the diffraction pressure front. As a result of the diffraction pressure front a rarefaction front must progress in the opposite direction into the high pressure region.

By proper correlation of the three parameters a cone may be designed in such manner that the rarefaction front moves in at a rate less than or just offsetting the rate of normal lateral expansion. In this manner the diameter of the shock wave will remain the same or grow slightly larger as it is propagated to great distances. The pressure of the shock wave will attenuate in a manner known in the art.

Therefore, by proper correlation of the three parameters with the principles of hydrodynamics a wide range of shock tubes are available with a wide range of shock wave characteristics.

It should be noted that changing the three parameters not only changes the characteristics of the shock wave but also changes the amplifications of the explosive blast as recited in the copending application recited above.

In the operation of the shock tube of FIG. 2 the breech mechanism 19 is closed by an expendable disc 29 which may be slideably positioned within a slot, not shown, provided in the side of casing 24 and air valve 30 is opened and the water in the chamber is removed by bilge pump 31. The bilge pump is connected to the breech by pipe 32. It is considered obvious that other means could be used to remove the water from the breech, for example, compressed air, etc. The explosive charge 27 is placed in the breech in the spaced relationship. The cartridge of the explosive and the spacers 28 are made of material that will burn or disintegrate during the explosion, for example, Styrofoam. The detonating cap is held in a spaced relationship with the breech cap 25 until the charge is fired. The wires to the electroresponsive detonator are connected to connecting elements 33 sealed in the breech mechanism 19. Disc 29 is removed as by withdrawing it into the aforementioned slot provided in the side of casing 24 to allow water to enter the chamber prior to firing. All the air may be removed from the chamber by the air valve 30 so that water completely surrounds the charge when it is fired, if desired. In some instances it may be preferable to fire with air surrounding the charge. This method has been found to reduce the shock energy transferred to the firing block.

Figure 3:
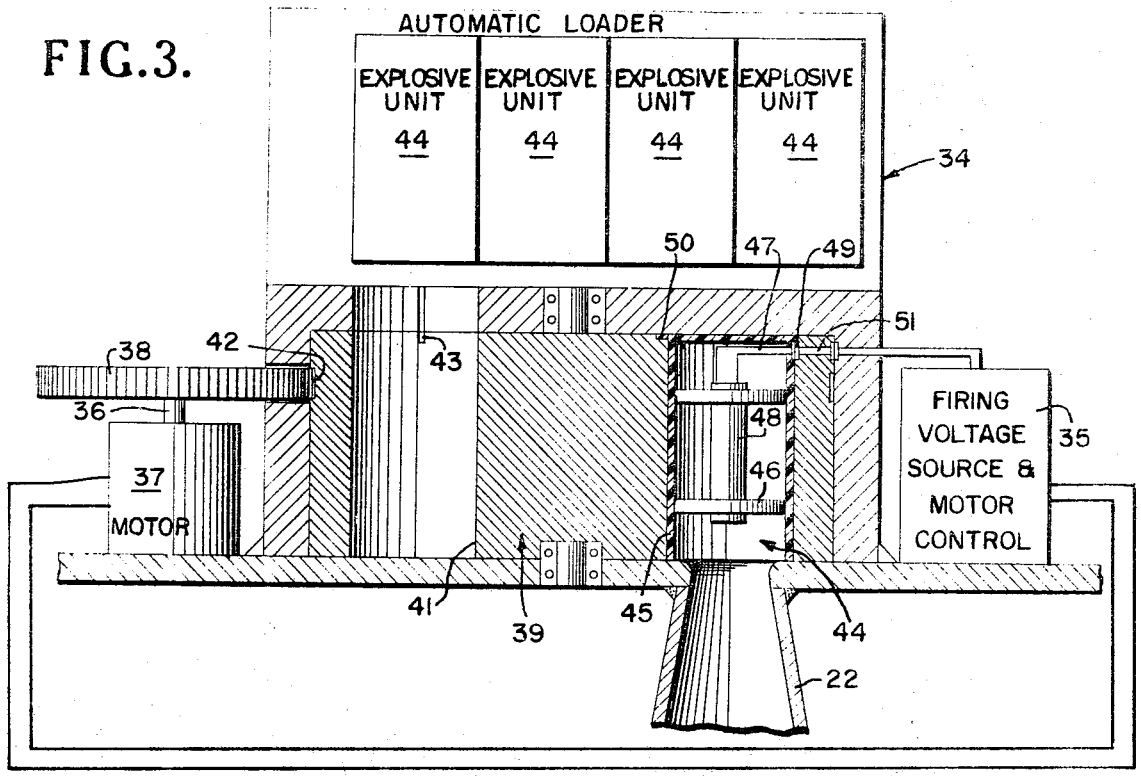
FIG. 3 is a schematic diagram of the conical shock tube of FIG. 2 with a means for repetitive firing.

By use of an automatic loader 34 as shown in FIG. 3 the rate of explosions may be greatly increased. The controller 35 controls the firing voltage source and the motor 37. The motor 37 rotates gear 38 attached to the motor shaft 36. The firing block 39 has a multiple of firing chambers 41 located therein. The firing block 39 has a gear track 42 on the outer circumference thereof which meshes with gear 38 to rotate the firing block as required and to align the firing chambers with tube 22. A sealed explosive unit 44 is loaded into one of the chambers 41, preferably into the chamber which is to be aligned with tube 22 when the block 39 is next rotated. The explosive unit includes a casing 45, spacers 46, electrical leads 47 and an explosive 48. The electrical leads 47 make contact with the contacts 49 of the controller through built in leads 51 in the firing chamber when it is rotated into the firing position. Casing 45 has an aligning pin 50 which fits into an aperture 43 in chamber 41 insuring that the explosive unit will be in proper alignment so that the electrical contacts will be engaged. Water is allowed to completely surround the charge before it is fired, if desired.

In this manner the next charge is ready to be fired as soon as the reflected signal from the prior charge is received. During rotation of the firing block 39, sealing of the device from the interior of the submarine may be provided by any suitable sealing means such as, for example, seals 17 and 18 of FIG. 2.

Figure 4:
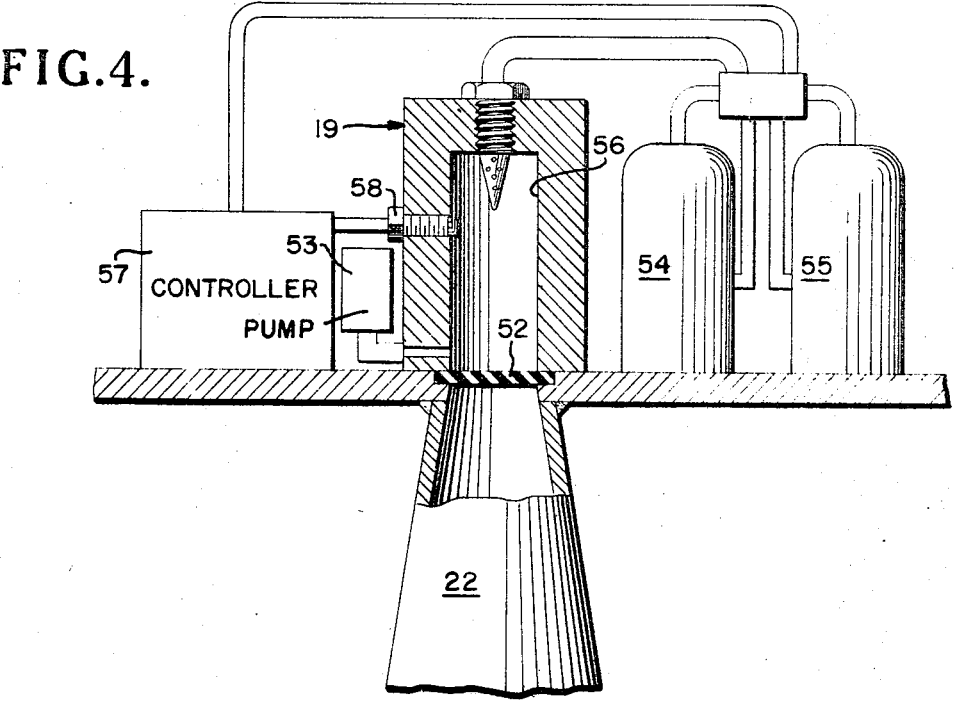
FIG. 4 is a schematic diagram of another embodiment of the invention.

Refer to FIG. 4 which illustrates an alternate form of the invention. This figure discloses a conical shock tube 22 capable of using fluids as a source of explosive for a shock wave. In operation an ignitible frangible baffle 52 is inserted into position and the water is removed from the chamber by pump 53. The volatile fluid 54 and oxygen 55 is forced into firing chamber 56 of the tube 19 by the controller 57. The controller 57 determines the amount of explosive fluids injected into the firing chamber and the time sequence of each firing. The explosive fluids are ejected into the firing chamber 56 in sufficient quantity to provide an equalizing pressure on the disc 52. Immediately upon firing the disc breaks and burns releasing the full shock wave into the amplifier shock tube 22. The controller 57 ignites the explosive fluids by causing a spark to jump across the gap in plug 58 which detonates the explosive fluids. Immediately upon detonation the disc 52 is broken and burns. Thus the full shock wave is released into the amplifier shock tube and the liquid medium for propagation.

By use of this novel conical shock tube it is now possible to use an explosive as a sound source which will greatly extend the range of the effectiveness of the sonar unit. The conical shock tube will also control the direction of the explosive pulse so that as the reflected wave returns it may be intelligently interpreted.

Obviously many modifications and variations of the present invention are possible in the light of the above teachings. It is therefore to be understood, that within the scope of the appended claims, the invention may be practiced otherwise than as specifically described.

What is claimed is:

1. A unidirectional underwater vibration source mounted on an underwater craft for greatly amplifying the shock wave of a small high explosive charge in a liquid medium comprising a frustoconical tube, a rotatable firing block having a plurality of firing chambers therein, control means for moving each of the plurality of firing chambers in said block in direct communication with said tube at the smallest end thereof in rapid succession, a plurality of explosive means, one of said plurality of explosive means located in each of the plurality of firing chambers respectively in said firing block and ignitor means for firing each of said plurality of explosive means when the firing chamber in which it is located is aligned with said tube.

2. The underwater source of vibration of claim 1 wherein each of said plurality of explosive means is spacially mounted in the respective firing chamber.

3. The underwater source of vibration of claim 1 wherein the control means for rotating each of the plurality of firing chambers in direct communication with said tube includes a motor geared to said firing block and a motor control connected to said motor for periodically actuating said motor.

4. A unidirectional underwater vibration source mounted on an underwater craft for greatly amplifying the shock wave of a small high explosive charge in a liquid medium comprising a rigid frustoconical tube, a firing block supporting said frustoconical tube and having a firing chamber therein in direct communication with said frustoconical tube at the small end thereof, a small high-explosive detonating charge positioned in said firing chamber in spaced relation with the walls of said firing block for generating a shock vibration, an electroresponsive ignitor means for igniting said high-explosive charge, means for removing any liquid medium from said firing chamber prior to inserting said high-explosive charge therein, and means for completely surrounding said high-explosive charge with the liquid medium prior to actuating said electroresponsive ignitor means.

5. The underwater vibration source of claim 4 which includes means for rotating said firing block about an axis substantially perpendicular to the cone axis of said frustoconical tube thereby to control the direction of the shock wave propagated.

References Cited

UNITED STATES PATENTS

| | | | |
|---|---|---|---|
| 1,385,109 | 7/1921 | Bowker | 340—12 XR |
| 1,500,243 | 7/1924 | Hammond | 340—12 |
| 1,806,745 | 5/1931 | De Forest | 340—12 |
| 2,768,246 | 10/1956 | Klein | 340—12 |
| 3,097,600 | 7/1963 | Hopkins et al. | 102—7 |
| 2,203,140 | 6/1940 | Green | 181—0.5 |
| 2,561,309 | 7/1951 | Gaby | 181—0.5 |

RICHARD A. FARLEY, Primary Examiner

U.S. Cl. X.R.

340—12